(12) United States Patent
Shendi

(10) Patent No.: US 8,008,833 B2
(45) Date of Patent: Aug. 30, 2011

(54) STATOR FOR AN ELECTRICAL MACHINE

(75) Inventor: Alexander Shendi, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 467 days.

(21) Appl. No.: 10/583,672

(22) PCT Filed: Dec. 14, 2004

(86) PCT No.: PCT/EP2004/053466
§ 371 (c)(1),
(2), (4) Date: Feb. 20, 2007

(87) PCT Pub. No.: WO2005/064766
PCT Pub. Date: Jul. 14, 2005

(65) Prior Publication Data
US 2007/0216253 A1 Sep. 20, 2007

(30) Foreign Application Priority Data
Dec. 30, 2003 (DE) .................................. 103 61 858

(51) Int. Cl.
*H02K 1/06* (2006.01)
(52) U.S. Cl. ... 310/216.111; 310/216.004; 310/216.012; 310/180; 310/214
(58) Field of Classification Search ............. 310/218, 310/216, 180, 214, 216.004, 216.012, 216.111
See application file for complete search history.

(56) References Cited

U.S. PATENT DOCUMENTS

| | | | |
|---|---|---|---|
| 5,642,013 A | 6/1997 | Wavre | |
| 6,313,559 B1 | 11/2001 | Kusase et al. | |
| 6,611,076 B2 * | 8/2003 | Lindbery et al. | 310/216 |
| 6,727,625 B2 | 4/2004 | Ooiwa | |
| 2002/0036439 A1 | 3/2002 | Ooiwa | |
| 2002/0074892 A1 * | 6/2002 | Lindbery et al. | 310/254 |
| 2002/0093254 A1 * | 7/2002 | Asao et al. | 310/58 |
| 2002/0117929 A1 * | 8/2002 | Bradfield | 310/216 |

FOREIGN PATENT DOCUMENTS

| | | |
|---|---|---|
| DE | 89 05 354 | 2/1990 |
| DE | 695 03 521 | 3/1999 |
| DE | 101 46 922 | 4/2002 |

(Continued)

OTHER PUBLICATIONS

Ojo, O. "Multiobjective Optimum Design of Electrical Machines for Variable Speed Motor Drives." Proceedings of the Industry Applications Society Annual Meeting. Dearborn, Sep. 28-Oct. 1, 1991, New York, IEEE, US, BD. vol. 2. p. 163-168, XP010056290. ISBN: 0-7803-0453-5.

(Continued)

*Primary Examiner* — Quyen Leung
*Assistant Examiner* — Alex W Mok
(74) *Attorney, Agent, or Firm* — Michael J. Striker

(57) ABSTRACT

A stator for an electrical machine, in particular a rotary current generator, is proposed, in which the stator (36) is made by the flat-packet technique and comprises at least one stator iron (10) and a stator winding (30), and the stator iron (10) has a substantially annular-cylindrical shape, and the stator iron (10) has an axial direction (a) which is oriented in the direction of a cylinder axis, and the stator iron (10) has an end face, oriented in the direction of the cylinder axis and defining a slot area ($A_{Nut}$), and a ratio (A) formed of the slot area ($A_{Nut}$) and the end face area amounts to between 0.4 and 0.8.

11 Claims, 6 Drawing Sheets

FOREIGN PATENT DOCUMENTS

| | | |
|---|---|---|
| EP | 0 394 526 | 10/1990 |
| EP | 1 120 881 | 8/2001 |
| EP | 1 223 657 | 7/2002 |
| EP | 1 239 568 | 9/2002 |
| EP | 1 353 431 | 10/2003 |
| JP | 05184088 | 7/1993 |
| WO | 01/54254 | 7/2001 |

OTHER PUBLICATIONS

Biedinger J-M et al. "Dimensionnement Des Actionneurs Electriques Alimentes A Frequence Variable Sous Faible Tension." European Variable Journal Applied Physics, EDP Sciences, Les Ulis, FR, BD.7, NR. 3, Sep. 1999. p. 24-261, XP0009330361 ISSN: 1286-0042.

* cited by examiner

STATOR FOR AN ELECTRICAL MACHINE

CROSS-REFERENCE TO A RELATED APPLICATION

The invention described and claimed hereinbelow is also described in German Patent Application DE 10361858.9 filed on Dec. 30, 2003. This German Patent Application, whose subject matter is incorporated here by reference, provides the basis for a claim of priority of invention under 35 U.S.C. 119(a)-(d).

BACKGROUND OF THE INVENTION

The invention relates to a stator for an electrical machine.

From published German Patent Application WO 01/54254 A1, a stator for an electrical machine is known which is made by what is known as the flat-packet technique. The flat-packet technique can be described by saying that at first, individual striplike laminations are furnished, which are packeted into a so-called flat packet. To that end, the laminations are arranged in such a way that they are stacked on one another congruently. This forms an approximately block-shaped, essentially flat stator iron, which on one side in comblike fashion has the electromagnetically operative slots and teeth, which once the stator has been completed are provided for the interaction with a rotor. Into this comblike, block-shaped stator iron, a separately prepared, as a rule three-phase winding is inserted, so that initially, either all the coil sides are located in the slots, or the great majority of the coil sides, as disclosed in the reference cited. This semifinished product comprising the stator iron with the winding is then bent into a round shape in an apparatus in such a way that a circular-annular, annular-cylindrical stator is created. Optionally existing winding transitions, which upon insertion of the winding into the stator iron are at first not located in slots, are introduced into the corresponding slots in the course of the bending into the round shape. After the bending into the round shape, two face ends oriented in the peripheral direction are located directly opposite one another. These face ends can then be joined together, for instance by a welding operation.

In the course of development work for this stator and the associated electrical machine, it has been demonstrated that by making various provisions, in particular dimensional ratios of such a stator or stator iron, very different results are attained.

SUMMARY OF THE PRESENT INVENTION

The stator according to the invention having the characteristics of the main claim has the advantage that because of the ratio A formed from the slot area and the end face area and amounting to between 0.4 and 0.8, a first approximation for an optimal design of a stator in accordance with the intended production process is indicated.

In a second approximation, it is provided that the ratio A is between 0.4 and 0.7. This second, narrower ratio provides a marked improvement in terms of dimensioning, so that with this second range of the ratio, with little consumption of material, on the one hand the current yield with respect to the mass of the stator is improved, and on the other, the bending resistance of the stator or the stator iron is in a range which permits both bending of the flat stator into the round shape and the dimensional stability of the round stator.

In the drawings, exemplary embodiments of a stator of the invention are shown.

DESCRIPTION OF THE PREFERRED EMBODIMENTS

Figure 1:
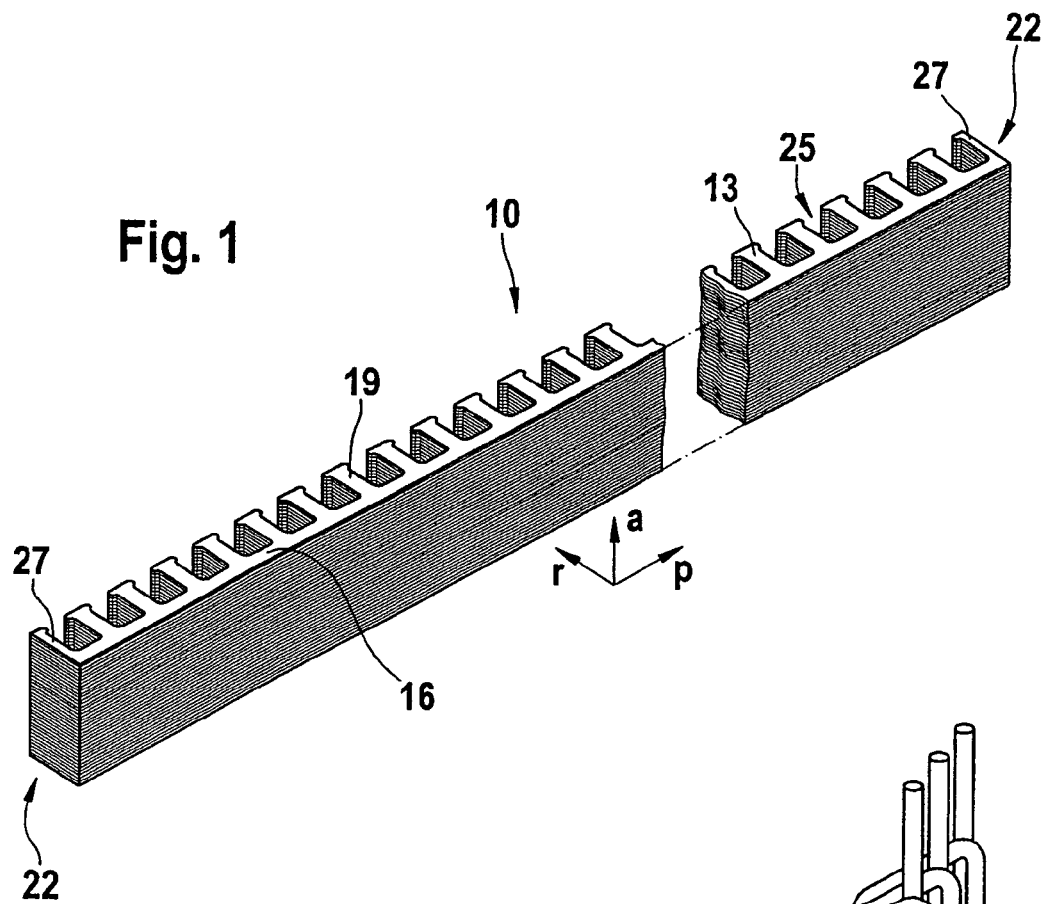
FIG. 1 shows a flat packet without a winding.

FIG. 1 shows a flat or substantially flat stator iron 10, which has been made into a packet comprising a defined number of individual laminations 13. The laminations 13 are stacked one above the other in the so-called axial direction a, so that they are located one above the other congruently. A yoke 16 extends in the so-called circumferential direction p, which later extends annularly in the completed stator. From the yoke 16, so-called inner teeth 19 extend in the radial direction r and later, in the completed stator, they extend radially inward. The stator iron 10 has two face ends 22 in the circumferential direction p which rest directly against one another after the stator iron 10 has been bent into a round shape. If the stator iron 10 is equipped with thirty-six slots 25, for example, then this stator iron 10 has a total of thirty-five complete inner teeth 19 and one half-inner tooth 27 on each of the face ends 22. In the stator iron 10 or stator bent into the round shape, the two half-inner teeth 27 then contacting one another add up to one complete inner tooth. In a stator iron 10 with forty-eight slots 25, the stator iron 10 analogously has forty-seven complete inner teeth 19 and again two half-inner teeth 27.

Figure 2:
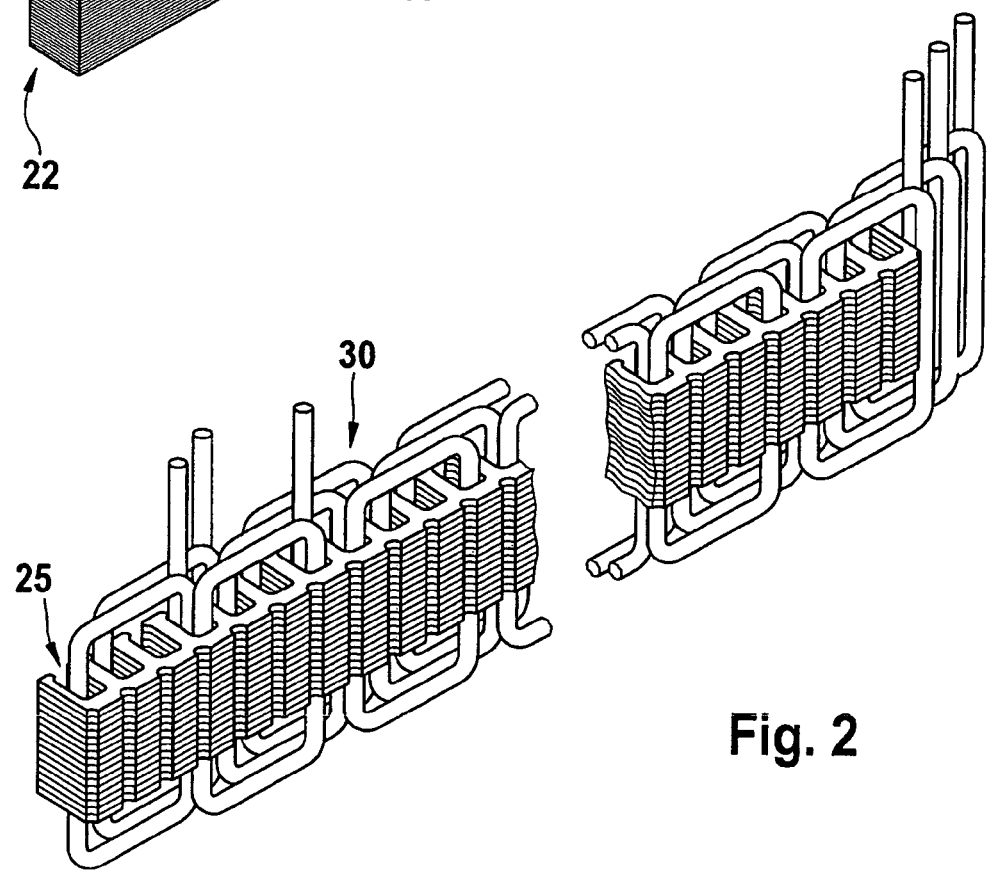
FIG. 2 shows a flat packet with an inserted three-phase winding.

FIG. 2 shows the stator iron 10 of FIG. 1, into whose slots 25 a stator winding 30 is inserted. If the stator is intended for a rotary current generator, then the stator winding 30 is embodied as a three-phase winding. The stator winding 30 is initially manufactured separately from the manufacture of the stator iron 10. The stator winding 30 can then, as one alternative, comprise individual phases which are each introduced separately into the slots 25 of the stator iron 10. However, as another alternative, the stator winding 30 may also, as in the prior art cited at the outset, be manufactured such that the three phases of the stator winding 30 are prepared in the form of a practically one-piece stator winding 30. This practically one-piece stator winding 30 is then inserted in its entirety and in one step into the slots 25 of the stator iron 10.

Figure 3:
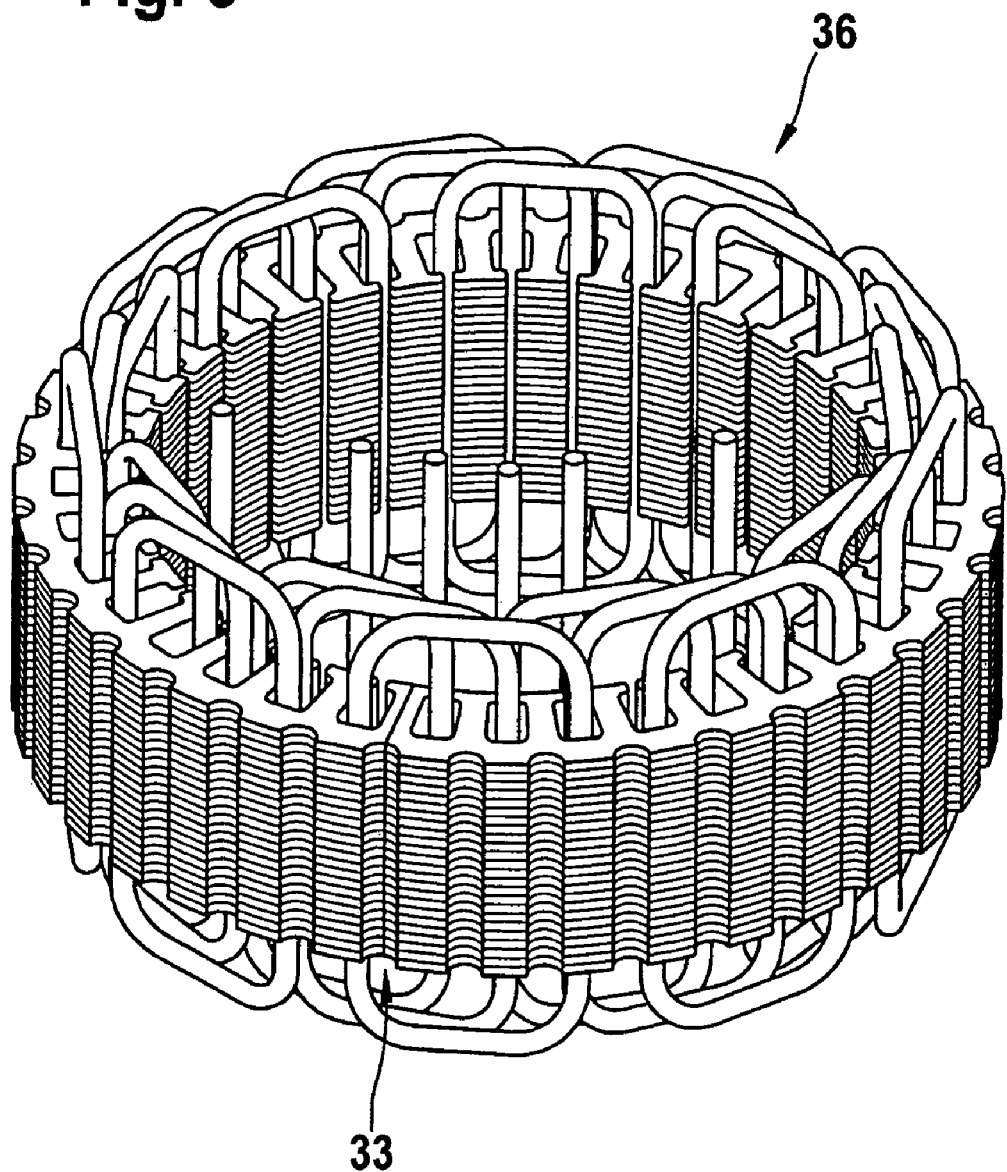
FIG. 3 shows the flat packet with the winding from FIG. 2, after the joint bending of the winding and iron packet into a round shape.

Once the stator winding 30 has been placed in the stator iron 10, as described above, the semifinished product comprising these two parts is bent into a round shape, in such a way that the inner teeth 19 and half-inner teeth 27 extend radially inward and thus the yoke 16 surrounds the inner teeth 19 and 27. The slots 25 are then intrinsically open radially inward; see also FIG. 3. In FIG. 3, an abutment point 33 can be clearly seen, where the aforementioned two half-inner teeth 27 contact one another directly. The stator iron 10, or the stator 36 thus created, now has an essentially annular-cylindrical shape. This annular-cylindrical shape has a cylinder axis which can be inscribed in the interior of the stator 36.

This cylinder axis extends in the above-described axial direction and thus in the stacking direction of the individual laminations 13.

The basic manufacturing process of FIGS. 1 through 3 describes the essential characteristics of what is known as the flat-packet technique for producing stators 36 for electrical machines. Briefly, this flat-packet technique can be described by the following characteristics: An essentially striplike stator 10 is furnished, which optionally has a laminated construction. An at least one-piece stator winding 30 is placed in the slots 25 of the stator iron 10. In a following step, the stator iron 10 with the stator winding 30 is put into an annular-cylindrical shape.

Figure 4:
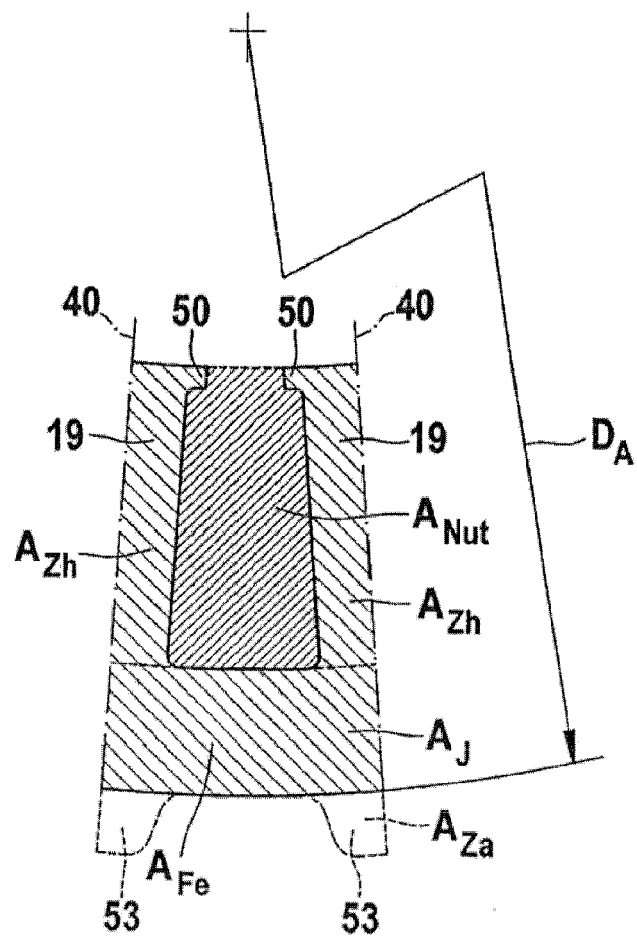
FIG. 4 shows a detail in elevation view of an end face of a stator iron for the sake of clearly showing the slot area and end face.

FIG. 4 shows a detail of an elevation view of the end face of the stator iron 10, which is oriented in the direction of the cylinder axis or axial direction a. The circular-annular segment between two adjacent radially oriented center lines 40 of two immediately adjacent inner teeth 19 is assumed here to be the slot area $A_{Fe}$. The slot area $A_{Fe}$ accordingly comprises the surface portions $A_{zh}$ of two half-inner teeth 19 and the corresponding yoke face portion $A_J$ between the center lines 40. A slot area $A_{Nut}$ is created from the contours of the corresponding yoke face and the inner teeth 19 as well as by the circular boundary line between two tooth heads 50 of the inner teeth 19. Examinations of stators 30 made by the aforementioned flat-packet technique have demonstrated that a ratio A formed of the slot area $A_{Nut}$ and the end face area $A_{Fe}$ favorably amounts to between 0.4 and 0.8. It can thus be stated as a favorable combination of characteristics for a stator 36 that this stator 36 made by the flat-packet technique initially comprises a stator iron 10 and stator winding 30, and the stator iron 10 has a substantially annular-cylindrical shape and the stator iron 10 has an axial direction a, which is oriented in the direction of a cylinder axis, and the stator iron 10 has an end face, oriented in the direction of the cylinder axis, that has a slot area $A_{Nut}$, and a ratio A formed of the slot area $A_{Nut}$ and the end face area $A_{Fe}$ amounts to between 0.4 and 0.8.

In a further approximation, it has been found that the ratio A is even more favorable if it is between 0.4 and 0.7.

The end face area taken into account for the ratio A does not include the cross-sectional area $A_{Za}$ that can be ascertained in the axial direction a and that is formed for instance by the corresponding cross-sectional area of two half-teeth 53 that on the outside are oriented radially outward. If the outer contour of the yoke 16 in the radial direction does not describe a circular line, then the smallest diameter that the outer contour of the stator iron describes in the region $b_3$ above the slot is used as the outer diameter $D_A$ for calculating the end face area $A_{Fe}$.

It has furthermore been found that the ratio A, depending on the number of teeth of the stator iron 10, can assume different ideal values. For instance, it has been found that stator irons 10 that have forty-eight inner teeth 19 favorably have a ratio A of between 0.45 and 0.7. It is clear that one of the forty-eight inner teeth 19 must be considered equivalent to two half-inner teeth 27.

In a second approximation, it has been found that stator irons 10 with forty-eight inner teeth 19 19 favorably assume a ratio A of between 0.45 and 0.6. For stator irons 10 with thirty-six inner teeth 19, a numerical range between 0.4 and 0.6 is considered a favorable ratio A.

In a second approximation, for a stator iron 10 with thirty-six inner teeth 19, a favorable ratio A is considered to be between 0.4 and 0.55.

Figure 5:
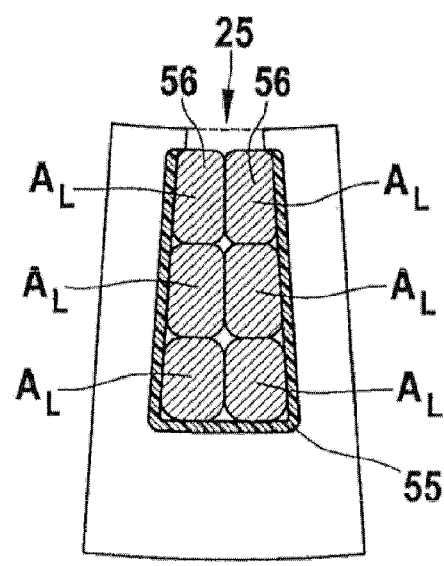
FIG. 5 shows a detail of a cross section through a slot, provided with conductors, to illustrate the conductor cross section.
Figure 6A:
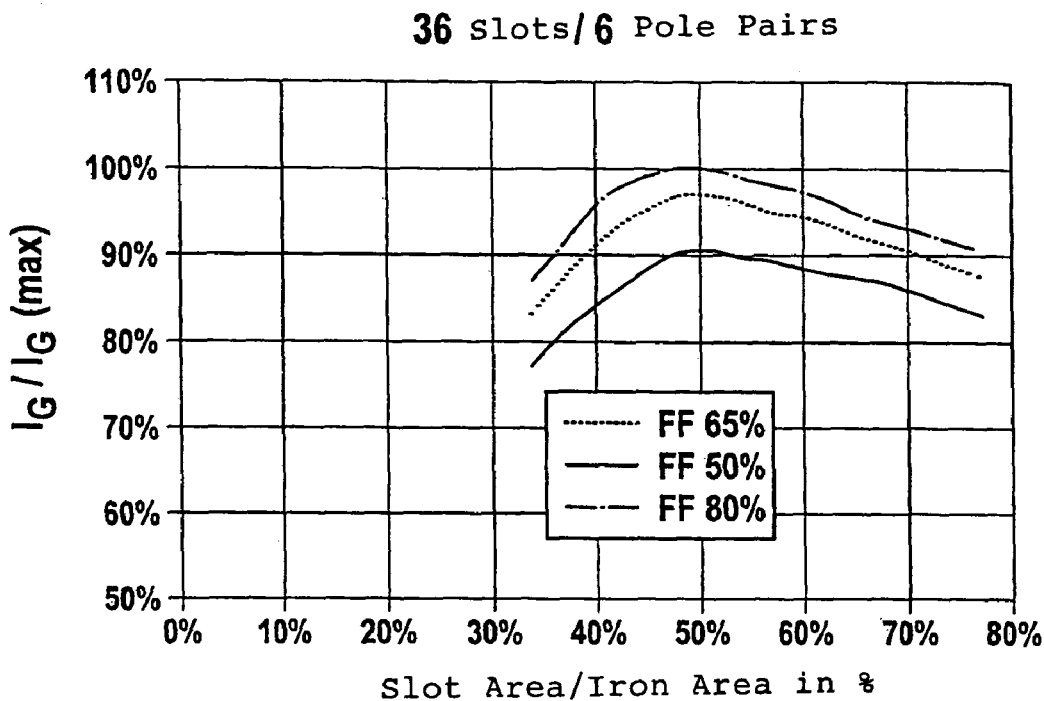
FIG. 6a shows a first "current graph"

In conjunction with FIG. 4, it will be explained how the slot area $A_{Nut}$ is ascertained. In conjunction with FIG. 5, it will be explained how the cross-sectional area of the conductors 56 located in the slot 25 can be ascertained. Each conductor 56 has a conductor cross section $A_L$. The total of all the conductor cross sections in one slot 25 is thus the total of the individual conductor cross sections $A_L$, or in other words $A_{L,total}$. A slot fill factor F is defined here as the ratio of the cross-sectional area of all the conductors 56 in one slot 25 and the slot area $A_{Nut}$. For stator irons 10 or stators 36 with thirty-six slots 25 and thirty-six inner teeth 19, in a version for rotary current machines with six pole pairs, the stator current $I_G$ has been ascertained as a function of the ratio A and the fill factor F. Fill factors F of 50%, 65% and 80% were examined here. It was ascertained that the highest generator current is attained for a fill factor F of 80%; see also FIG. 6a. Accordingly, for a fill factor F of 80%, the corresponding curve in FIG. 6a is marked $F_{80}$. The abscissa axis indicates the ratio A in a range between approximately 0.6 and 2.0, while the ordinate axis shows the ratio B of between 0.5 and 1.0. The ratio B is ascertained as a function of the current course for a fill factor F. For that purpose, in a corresponding electrical machine with a stator 10 and a slot fill factor F=80%, the corresponding generator current or stator current has been ascertained. The maximum value of this current course is set to be equal to 100%, or in other words 1.0. Based on this maximum value, the curve course for a slot fill factor $F_{80}$ was plotted. Analogously, the stator current for a slot fill factor F=65% and a slot fill factor F=50% was ascertained. The corresponding curves are designated as $F_{65}$ and $F_{50}$, respectively. The corresponding curve courses were referred to the maximum value for the current for a slot fill factor F=80%.

On the basis of these findings, for a stator made by the flat-packet technique with thirty-six slots 25 and thirty-six inner teeth 19 with six pole pairs, a ratio A of between 0.4 and 0.55 is preferred, while at the same time the slot fill factor should be between 50% and 80%.

Figure 6B:
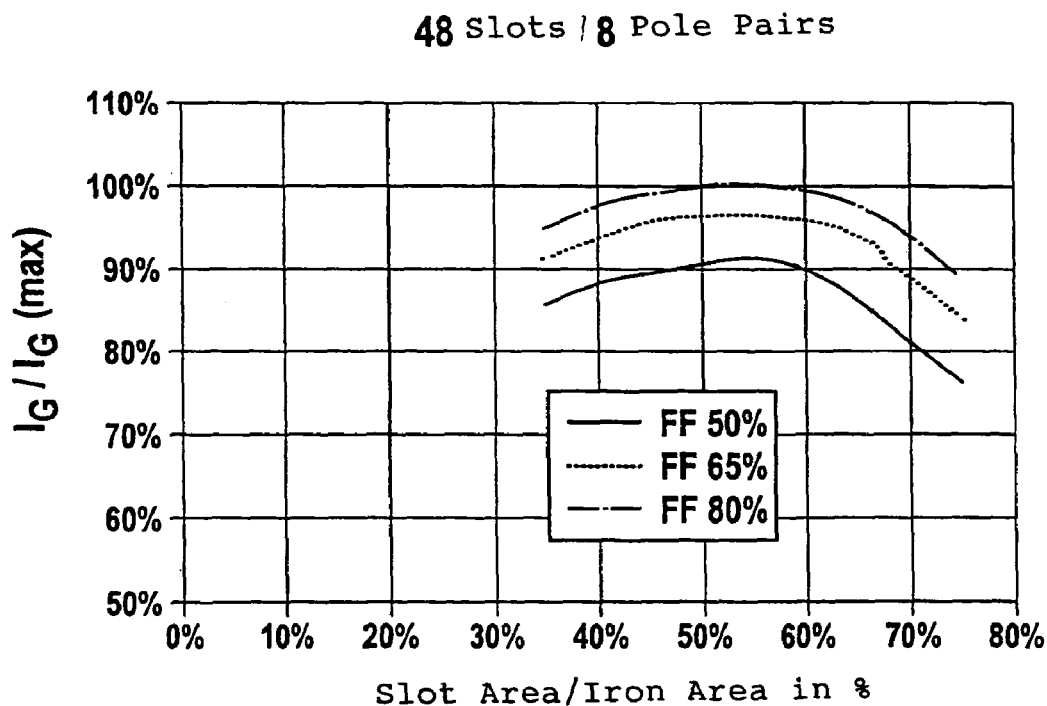
FIG. 6b shows a second "current graph"

FIG. 6b shows a graph, analogous to the graph of FIG. 6a, for a stator 36 with forty-eight slots 25 and forty-eight inner teeth 19 with eight pole pairs for a corresponding rotary current machine. On the basis of the findings ascertained here, a combination in which the ratio A is between 0.45 and 0.6 and the fill factor F is between 50% and 80% is preferred.

Figure 7:
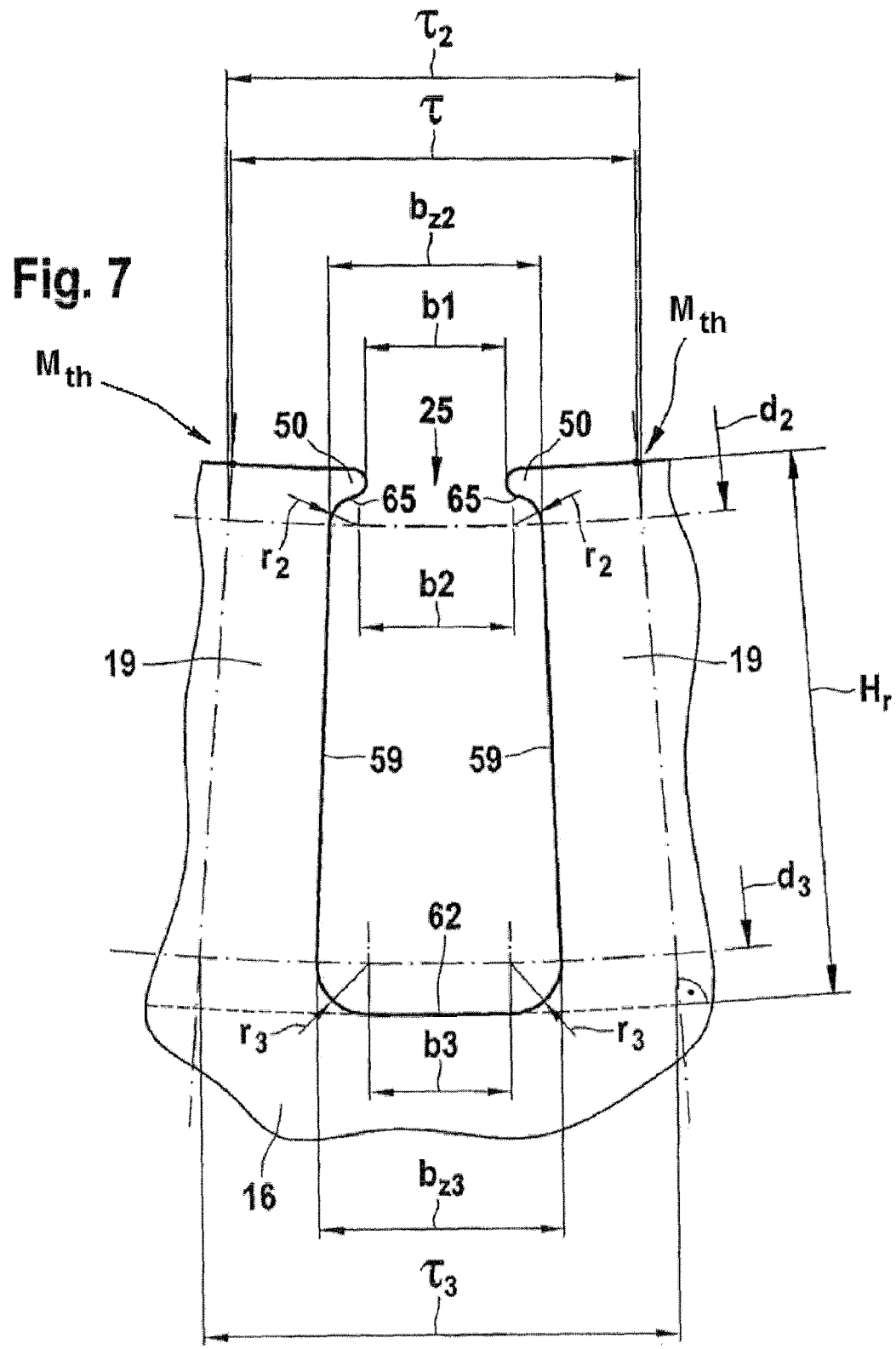
FIG. 7 shows a detail in elevation view of two inner teeth with the associated slot.

In conjunction with FIG. 7, the important geometrical relationships for a slot 25 will now be described. The width b1 designates the opening width of the slot slit or slot 25 existing in the bent-round state. The slot 25 has a contour that is defined on the side toward the yoke by diametrically opposed tooth sides 59 and by a yoke contour 62. The tooth sides 59 in this exemplary embodiment are rounded at the transition from the tooth sides 59 to the yoke contour 62 by radii $r_3$. The term "toward the yoke" here means the region of the slot 25 that is located on the side of the slot 25 oriented toward the yoke 16. The term "toward the tooth head" means that the corresponding region of the slot 25 is located on the side of the slot 25 that is toward the tooth head 55 and thus faces away from the yoke 16. In the exemplary embodiment, the tooth sides 59 of an internal slot 25 have a maximum spacing from one another in the circumferential direction that is designated here by the symbol $b_{z3}$. Thus for a slot 25 which is rounded by radii in the region between the yoke 16 and the tooth 19, $b_{z3}$ is composed of the spacing $b_3$ between the two center points of the radii and the two radii $r_3$ themselves, so that for $b_{z3}$ the equation that results is $b_{z3}=b_3+2*r_3$. In the event that a slot 25 is not rounded by any radii at all but instead by ellipses, chamfers, or any angular transitions between the tooth side 59 and the yoke contour 62, $b_{z3}$ should be the widest spacing, toward the yoke, between the two tooth sides 59.

The slot pitch τ2 is defined as the spacing between two tooth centers at the diameter of the spacing $b_{z2}$; the slot pitch $\tau_3$ is defined as the spacing between two tooth centers at the diameter of the spacing $b_{z3}$. The diameter d3 is the diameter at which the spacing $b_{z3}$ is defined, and the diameter d2 is the diameter at which the spacing $b_{z2}$ is defined. For the ratio of d3 to d2, a numerical range between 1.1 and 1.25 should apply.

Analogously, there is a contour, toward the tooth head, of the inner slot 25 that is defined by the diametrically opposed tooth sides 59 and tooth head contours 65. The tooth head contour 65, in this exemplary embodiment, begins at the transition from the rectilinear tooth sides 59 to the constriction, predetermined by radii $r_2$, of the slot slit or slot 25 in the direction radially inward. The width $b_2$ here designates the spacing of the center points of the radii $r_2$, so that the total of the center point spacing $b_2$ and the two radii $r_2$, adding up to $b_{z2}$, is the width, toward the tooth head, of the slot 25, or in other words the spacing of the tooth sides 59.

In the event that there is no unequivocal relationship, along the lines of the definitions given above, of the spacings $b_{z2}$b and $b_{z3}$, for instance if the tooth sides 59 bulge slightly, then the following further definition should apply for the aforementioned spacings $b_{z2}$ and $b_{z3}$: Based on rounded tooth head contours 65, which means that the transition from the tooth widths 59 into the inner circumference of a stator iron 10 or of the stator 30 is completely rounded, under some circumstances it is not possible to state a radial height for the slot 25 unambiguously. As an aid in this situation, the radial spacing $H_r$ between the yoke contour 62, or its circular extension, and a center point of a tooth head should apply. The center points of the tooth head $M_{th}$, or the spacing between two adjacent tooth head center points, furthermore defines the slot pitch $\tau$. If this spacing is set at 100%, this means that the width, or spacing $b_{z2}$, beginning at the lowest point of the slot 25 or at the yoke 16 from which the inner teeth 19 extend, is ascertained as 90%, and the same is analogously true for the spacing $b_{z3}$, which is ascertained at a height of 8%.

Figure 8:
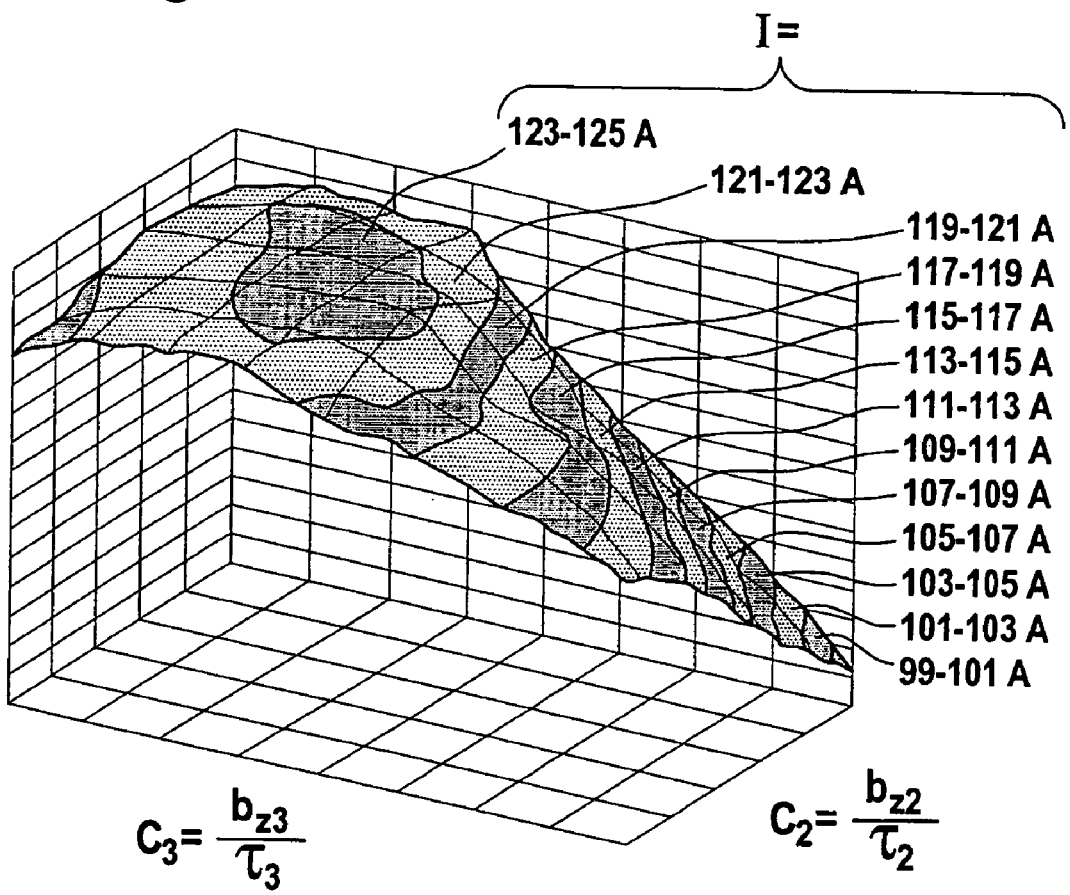
FIG. 8 is a three-dimensional graph, showing the output current of a motor vehicle generator as a function of two different length ratios during engine idling, corresponding to approximately 1800 rpm of the generator rotor.

In FIG. 8, a relationship between the stator current at engine idling (corresponding to a rotary speed of the generator rotor of approximately 1800 rpm) as a function of the ratios c2 and c3. c2 is the quotient of the slot width toward the tooth head, or spacing $b_{z2}$, and the slot pitch $\tau_2$ at the tooth; c3 is the ratio formed of the spacing $b_{z3}$ toward the yoke and the slot pitch $\tau_3$ at the yoke. For a stator 36, it is provided that the ratio c2 and the ratio c3 amount to between 0.45 and 0.65.

Especially preferably, c2 amounts to between 0.50 and 0.60, and C3 amounts to between 0.47 and 0.6.

If the transitions between the tooth sides 59 and the yoke contour 62, and/or between the tooth sides 59 and the tooth head contour 65, are rounded, radii then $r_1$ and $r_2$ of between 0.3 and 2.0 mm are preferred.

The invention claimed is:

1. A stator for an electrical machine, in which the stator (36) is made by the flat-packet technique and comprises at least one stator iron (10, 30) and the stator iron (10) has a substantially annular-cylindrical shape, and in which the stator iron (10) has an axial direction (a) which is oriented in the direction of a cylinder axis, and the stator iron (10) has an end face which is oriented in the direction of the cylinder axis and defines a slot area ($A_{Nut}$), wherein a ratio A formed of the slot area ($A_{Nut}$) and the end face area amounts to between 0.4 and 0.7, wherein the stator iron (10, 30) has a number of individual laminations (13) which are stacked one above the other, and also has two face ends (22) which rest directly against one another.

2. The stator as defined by claim 1, wherein the stator iron (10) has forty-eight inner teeth (19), and the ratio A amounts to between 0.45 and 0.70.

3. The stator as defined by claim 2, wherein the ratio A is between 0.45 and 0.60.

4. The stator as defined by claim 1, wherein the stator iron (10) has thirty-six inner teeth (19), and the ratio A amounts to between 0.4 and 0.6.

5. The stator as defined by claim 4, wherein the ratio A is between 0.40 and 0.55.

6. The stator as defined by claim 1, wherein a slot fill factor (F) amounts to between 50% and 80%.

7. The stator as defined by claim 6, wherein the slot fill factor F amounts to between 60% and 70%.

8. The stator as defined by claim 1, wherein a slot (25) has a contour which is defined toward the yoke by diametrically opposed tooth sides (59) and a yoke contour (62), and the tooth sides (59) of a slot (25) have a maximum spacing ($b_{z3}$) from one another in the circumferential direction; and that a slot pitch ($\tau_3$) is the spacing between two directly adjacent tooth centers of the stator iron (10) at the diameter of the maximum spacing ($b_{z3}$), where (c3), which is a ratio formed of a spacing ($b_{z3}$) toward a yoke and the slot pitch ($\Sigma_3$) at the yoke, amounts to between 0.45 and 0.65.

9. The stator as defined by claim 1, wherein a slot (25) has a contour which is defined toward the tooth head by diametrically opposed tooth sides (59) and tooth head contours (62), and the tooth sides (59) of a slot (25), at the transition to the tooth head contours (65), have a spacing ($b_{z2}$) from one another in the circumferential direction; and that a slot pitch ($\tau_2$) is the spacing between two directly adjacent tooth centers at the diameter of the spacing ($b_{z2}$) of the stator iron (10), and where (c2), which is a quotient of a slot width toward a tooth head and a slot pitch ($\tau_2$) at a tooth, amounts to between 0.45 and 0.65.

10. The stator as defined by claim 9, wherein (c2) amounts to between 0.50 and 0.60 and (c3), which is a ratio formed of a spacing ($b_{z3}$) toward a yoke and a slot pitch ($\tau_3$) at the yoke, amounts to between 0.47 and 0.60.

11. The stator as defined by claim 1, wherein tooth sides (59) change over by means of rounded transitions to tooth head contours (65) and a yoke contour (62), and the radii amount to between 0.3 mm and 2.0 mm.

* * * * *